United States Patent
Spehar et al.

(10) Patent No.: US 12,365,396 B1
(45) Date of Patent: Jul. 22, 2025

(54) VEHICLE FRAME RAILS WITH SWAGED SPACER CONNECTION AND METHODS OF MANUFACTURING VEHICLE FRAME RAILS

(71) Applicant: AM General LLC, South Bend, IN (US)

(72) Inventors: Jeffrey R. Spehar, Northville, MI (US); Poparad N. Hariton, Farmington Hills, MI (US)

(73) Assignee: AM General LLC, South Bend, IN (US)

( * ) Notice: Subject to any disclaimer, the term of this patent is extended or adjusted under 35 U.S.C. 154(b) by 274 days.

(21) Appl. No.: 17/879,313

(22) Filed: Aug. 2, 2022

Related U.S. Application Data

(60) Provisional application No. 63/228,305, filed on Aug. 2, 2021.

(51) Int. Cl.
*B62D 21/02* (2006.01)
*B62D 27/02* (2006.01)

(52) U.S. Cl.
CPC ........... *B62D 27/023* (2013.01); *B62D 21/02* (2013.01); *B62D 27/02* (2013.01)

(58) Field of Classification Search
CPC ...... B62D 21/02; B62D 21/09; B62D 27/023; B62D 65/02
USPC ......... 296/203.01–4, 204; 280/785, 798, 800
See application file for complete search history.

(56) References Cited

U.S. PATENT DOCUMENTS

| | | | |
|---|---|---|---|
| 294,852 A | 3/1884 | Colby | |
| 426,561 A | 4/1890 | Dithridge | |
| 765,139 A | 7/1904 | Hirsch | |
| 1,191,729 A | 7/1916 | Pool | |
| 1,215,965 A | 2/1917 | Murray | |
| 1,491,563 A | 4/1924 | Stresau | |

(Continued)

FOREIGN PATENT DOCUMENTS

| | | |
|---|---|---|
| CN | 205930896 U | 2/2017 |
| DE | 3317808 A1 | 11/1984 |

(Continued)

OTHER PUBLICATIONS

Representation of prior art vehicle frame rail, undated, 1 page.

(Continued)

*Primary Examiner* — Dennis H Pedder
(74) *Attorney, Agent, or Firm* — Barnes & Thornburg LLP

(57) ABSTRACT

A vehicle frame rail includes a first half having a hole, a second half having a hole, and a spacer. The second half is connected to the first half such that the hole in the first half is aligned with the hole in the second half and so as to form an enclosed space between the first half and the second half. The spacer has a first end, a first projection extending from the first end, a second end, a second projection extending from the second end, and a bore extending from the first end to the second end. The spacer is located in the enclosed space such that the first projection of the spacer extends into the hole of the first half and the second projection of the spacer extends into the hole of the second half. A method of manufacturing a vehicle frame rail includes pressing a projection on one of the spacers against the perimeter of a hole in one of the frame rail halves to connect the spacer to the frame rail half.

38 Claims, 15 Drawing Sheets

(56) References Cited

U.S. PATENT DOCUMENTS

| | | | |
|---|---|---|---|
| 1,835,243 A | 12/1931 | Schaffert | |
| 2,001,846 A | 5/1935 | Ledwinka | |
| 2,051,216 A | 8/1936 | Jones et al. | |
| 2,060,970 A | 11/1936 | Belden | |
| 2,113,399 A | 4/1938 | Dietrich | |
| 2,113,403 A | 4/1938 | Harmon | |
| 2,327,585 A | 8/1943 | Ulrich | |
| 2,380,523 A | 7/1945 | Hicks et al. | |
| 2,467,516 A | 4/1949 | Almdale | |
| 2,883,232 A | 4/1959 | Olley et al. | |
| 3,344,370 A | 9/1967 | Sewell | |
| 3,508,784 A | 4/1970 | Small | |
| 4,011,786 A | 3/1977 | Liebig | |
| 4,014,588 A | 3/1977 | Kohriyama | |
| 4,135,757 A | 1/1979 | Smith et al. | |
| 4,258,820 A | 3/1981 | Miura et al. | |
| 4,271,921 A | 6/1981 | Ochsner | |
| 4,283,898 A | 8/1981 | Claver | |
| 4,453,763 A | 6/1984 | Richards | |
| 4,604,013 A | 8/1986 | Elwell et al. | |
| 4,819,980 A | 4/1989 | Sakata et al. | |
| 4,863,214 A | 9/1989 | Kranis, Jr. | |
| 4,916,793 A | 4/1990 | Kuhn | |
| 4,934,861 A | 6/1990 | Weeks et al. | |
| 5,061,528 A | 10/1991 | Ruehl | |
| 5,061,529 A | 10/1991 | Ruehl | |
| 5,139,361 A | 8/1992 | Camuffo | |
| 5,149,132 A | 9/1992 | Ruehl et al. | |
| 5,152,840 A | 10/1992 | Ruehl | |
| 5,176,417 A | 1/1993 | Bauer | |
| 5,194,302 A | 3/1993 | Ruehl | |
| 5,259,660 A | 11/1993 | Haesters | |
| 5,264,252 A | 11/1993 | Ruehl | |
| 5,264,253 A | 11/1993 | Ruehl | |
| 5,308,115 A | 5/1994 | Ruehl et al. | |
| 5,487,219 A | 1/1996 | Ruehl et al. | |
| 5,560,674 A | 10/1996 | Tazaki et al. | |
| 5,573,222 A | 11/1996 | Ruehl et al. | |
| 5,662,444 A | 9/1997 | Schmidt, Jr. | |
| 5,682,678 A | 11/1997 | Gallagher et al. | |
| 5,865,362 A | 2/1999 | Behrmann et al. | |
| 5,980,174 A | 11/1999 | Gallagher et al. | |
| 6,010,155 A | 1/2000 | Rinehart | |
| 6,017,073 A | 1/2000 | Lindblom et al. | |
| 6,138,357 A | 10/2000 | Jones | |
| 6,186,696 B1 | 2/2001 | Valin | |
| 6,189,285 B1 | 2/2001 | Mockry | |
| 6,199,894 B1 | 3/2001 | Anderson | |
| 6,205,736 B1 | 3/2001 | Amborn et al. | |
| 6,216,763 B1 | 4/2001 | Ruehl et al. | |
| 6,237,304 B1 | 5/2001 | Wycech | |
| 6,299,210 B1 | 10/2001 | Ruehl et al. | |
| 6,309,157 B1 | 10/2001 | Amann et al. | |
| 6,394,537 B1 | 5/2002 | DeRees | |
| 6,412,818 B1 * | 7/2002 | Marando | B62D 21/02 |
| | | | 280/798 |
| 6,543,828 B1 | 4/2003 | Gass | |
| 6,585,468 B2 | 7/2003 | Johnson et al. | |
| 6,688,826 B2 | 2/2004 | Agha et al. | |
| 6,733,040 B1 | 5/2004 | Simboli | |
| 6,769,851 B2 | 8/2004 | Agha et al. | |
| 6,910,671 B1 | 6/2005 | Norkus et al. | |
| 7,144,040 B2 | 12/2006 | Kiehl et al. | |
| 7,201,398 B1 | 4/2007 | Christofaro et al. | |
| 7,219,954 B2 | 5/2007 | Gomi et al. | |
| 7,275,296 B2 | 10/2007 | DiCesare | |
| 7,290,778 B2 | 11/2007 | Domin | |
| 7,300,536 B1 | 11/2007 | Wang et al. | |
| 7,393,015 B1 | 7/2008 | Gillespie et al. | |
| 7,658,412 B2 | 2/2010 | Ramsey et al. | |
| 8,246,061 B2 | 8/2012 | Kang | |
| 8,484,930 B2 | 7/2013 | Ruehl | |
| 9,771,041 B2 | 9/2017 | Jaynes | |
| 10,549,783 B2 | 2/2020 | Haselhorst et al. | |
| 11,745,271 B2 * | 9/2023 | Nelgner | B23B 5/04 |
| | | | 82/112 |
| 2001/0039712 A1 | 11/2001 | Ruehl et al. | |
| 2002/0163173 A1 | 11/2002 | Ruehl et al. | |
| 2003/0126730 A1 | 7/2003 | Barber et al. | |
| 2003/0184075 A1 | 10/2003 | Freeman et al. | |
| 2003/0194292 A1 | 10/2003 | Deeg et al. | |
| 2005/0117997 A1 | 6/2005 | Pinzl | |
| 2006/0091701 A1 | 5/2006 | DiCesare | |
| 2006/0182519 A1 | 8/2006 | Welzel et al. | |
| 2006/0193714 A1 | 8/2006 | Werner | |
| 2006/0228194 A1 | 10/2006 | Nilsen et al. | |
| 2007/0107368 A1 | 5/2007 | Ruehl | |
| 2007/0176406 A1 | 8/2007 | Ruehl | |
| 2008/0029330 A1 | 2/2008 | DiCesare | |
| 2008/0072528 A1 | 3/2008 | Wolfe | |
| 2019/0322321 A1 | 10/2019 | Schwartz et al. | |

FOREIGN PATENT DOCUMENTS

| | | |
|---|---|---|
| DE | 19637243 A1 | 3/1998 |
| DE | 112014005658 T5 | 8/2016 |
| EP | 0841240 A2 | 5/1998 |
| EP | 1055829 A2 | 11/2000 |
| EP | 1984636 B1 | 8/2010 |
| EP | 1937538 B1 | 5/2016 |
| FR | 2977222 A3 | 1/2013 |
| JP | 404011582 A | 1/1992 |
| JP | 4598471 B2 | 12/2010 |
| WO | 2006045194 A1 | 5/2006 |
| WO | 2007090187 A2 | 8/2007 |
| WO | 2007090187 A3 | 8/2007 |

OTHER PUBLICATIONS

Information, photos and renderings of prior art re vehicle frame rails and components, undated, 11 pages.

European Patent Office, Communication Pursuant to Article 94(3) EPC in a European Patent Application No. 07762899.8, 3 pages, Jun. 23, 2009.

European Patent Office, International Search Report issued in PCT/US2021/064562, Mar. 28, 2022, 5 pages.

European Patent Office, Written Opinion issued in PCT Application No. PCT/US2021/064562, Mar. 28, 2022, 14 pages.

European Patent Office, International Search Report issued in PCT/US2007/061452, 3 pages, Jul. 24, 2007.

* cited by examiner

VEHICLE FRAME RAILS WITH SWAGED SPACER CONNECTION AND METHODS OF MANUFACTURING VEHICLE FRAME RAILS

This present application is a utility patent application claiming priority of U.S. Provisional Patent Application No. 63/228,305 filed Aug. 2, 2021. The present invention relates to vehicle components, and, in particular, to vehicle frame rails and methods of manufacturing vehicle frame rails.

BACKGROUND AND SUMMARY OF THE INVENTION

A typical vehicle chassis includes a pair of frame rails that extend along the length of the vehicle on opposite sides. The frame rails are connected by one or more cross members. Various vehicle components, such as, for example, suspension components, may be connected, either directly or indirectly, to the frame rails.

U.S. Pat. No. 2,327,585 discloses use of a bolt spacer or reinforcing member in connection with a vehicle chassis. This patent discloses a structural member having three elements. The first element includes a channel member forming a first panel. The second element includes a second panel. The third element includes one or more sockets and is positioned between the first and second elements. The sockets receive reinforcing elements in the form of tubular spacers. The reinforcing elements include a longitudinal bore sized to receive a bolt. The bolt, in combination with a nut, holds the three elements together.

U.S. Pat. No. 4,863,214 discloses a spacer tube matrix. The spacer tube matrix is intended for use within a vehicle frame having a box beam construction. The spacer tube matrix aligns a plurality of spacer tubes with openings in the side walls of the box beam construction. Bolts may be inserted through the openings in the box beam construction and the spacer tubes.

U.S. Pat. No. 8,484,930 discloses a box frame member having two sections with one or more openings in each section. Locators are formed around each of the holes. The locators extend into opposite ends of spacers placed between the two sections.

In one embodiment of the present invention, a vehicle frame rail includes a front rail section, a center rail section, a rear rail section, and a plurality of spacers. The front rail section has a first end, a second end, a first section and a second section. The first section of the front rail section has a central section, a first flange extending from the central section, a second flange extending from the central section, and a hole pattern. The second section of the front rail section has a first flange extending from the central section, a second flange extending from the central section, and a hole pattern corresponding at least in part to the hole pattern in the first section. The first flange of the first section of the front rail section extends toward and is connected to the first flange of the second section and the second flange of the first section of the front rail section extends toward and is connected to the second flange of the second section such that the hole pattern of the first section and the hole pattern of the second section are at least partially aligned and so as to form an enclosed space between the first and second sections. The center rail section has a first end connected to the second end of the front rail section, a second end, a first section and a second section. The first section of the center rail section has a central section, a first flange extending from the central section, a second flange extending from the central section, and a hole pattern. The second section of the center rail section has a central section, a first flange extending from the central section, a second flange extending from the central section, and a hole pattern corresponding at least in part to the hole pattern in the first section. The first flange of the first section of the center rail section extends toward and is connected to the first flange of the second section and the second flange of the first section of the center rail section extends toward and is connected to the second flange of the second section such that the hole pattern of the first section and the hole pattern of the second section are at least partially aligned and so as to form an enclosed space between the first and second sections. The rear rail section has a first end connected to the second end of the center rail section, a second end, a first section and a second section. The first section has a central section, a first flange extending from the central section, a second flange extending from the central section, and a hole pattern. The second section has a central section, a first flange extending from the central section, a second flange extending from the central section, and a hole pattern corresponding at least in part to the hole pattern in the first section. The first flange of the first section of the rear rail section extends toward and is connected to the first flange of the second section and the second flange of the first section of the rear rail section extends toward and is connected to the second flange of the second section such that the hole pattern of the first section and the hole pattern of the second section are at least partially aligned and so as to form an enclosed space between the first and second sections. The spacers have a first end, a second end, a first projection extending from the first end, a second projection extending from the second end, and a bore extending from the first end to the second end. One of the plurality of spacers is located such that the first projection extends into one of the holes in the first section of the front rail section and the second projection extends into one of the holes in the second section of the front rail section. A second one of the plurality of spacers is located such that the first projection extends into one of the holes in the first section of the center rail section and the second projection extends into one of the holes in the second section of the center rail section. A third one of the plurality of spacers is located such that the first projection extends into one of the holes in the first section of the rear rail section and the second projection extends into one of the holes in the second section of the rear rail section.

In one embodiment, the first projection of at least one of the plurality of spacers surrounds the bore. In another embodiment, the second projection of the at least one of the plurality of spacers surrounds the bore.

In other embodiments, at least one of the plurality of spacers has a main body portion extending from the first end to the second end, the main body portion has a first diameter, and the first projection of the at least one of the plurality of spacers has a second diameter different from the first diameter. In certain embodiments, the second diameter is smaller than the first diameter.

In one embodiment, the bore of at least one of the plurality of spacers is aligned with one of the holes in the first section of either the front rail section, the center rail section, or the rear rail section. In another embodiment, the bore of the at least one of the plurality of spacers is aligned with one of the holes in the second section of either the front rail section, the center rail section, or the rear rail section.

In some embodiments, the vehicle frame rail further includes a reinforcing member having a hole pattern corresponding at least in part to the hole pattern in the first and second sections of the center rail section. In one embodiment, at least one of the plurality of spacers extends into one of the holes of the reinforcing member. In certain embodiments, the first projection of the at least one of the plurality of spacers extends into one of the holes of the first section of the center rail section. In another embodiment, the first projection of the at least one of the plurality of spacers extends into one of the holes of the first section of the front rail section.

In another embodiment of the present invention, a vehicle frame rail includes a first half having a hole, a second half connected to the first half so as to form an enclosed space between the first half and the second half, and a spacer having a first end, a second end, a first projection extending from the first end, and a bore extending from the first end to the second end. The spacer is located in the enclosed space such that the first projection extends into the hole in the first half.

In one embodiment, the second half includes a hole aligned with the hole in the first half. In some embodiments, the spacer further includes a second projection extending from the second end of the spacer, and the spacer is located in the enclosed space such that the second projection extends into the hole in the second half.

In certain embodiments, the first projection surrounds the bore. In other embodiments, the second projection surrounds the bore.

In another embodiment, the spacer has a main body portion extending from the first end to the second end, the main body portion has a first diameter, and the first projection has a second diameter different from the first diameter. In some embodiments, the second diameter is smaller than the first diameter.

In one embodiment, the bore is aligned with the hole in the first half. In another embodiment, the bore is aligned with the hole in the first half and the hole in the second half.

In some embodiments, the vehicle frame rail further includes a reinforcing member located in the enclosed space, and the reinforcing member has a hole aligned with the hole in the first half. In one embodiment, the spacer extends into the hole of the reinforcing member. In other embodiments, the first projection extends into the hole of the first half.

In one embodiment of the present invention, a method of manufacturing a vehicle frame rail includes the steps of providing a first half of a frame rail, the first half having a hole pattern with at least one of the holes having a perimeter, providing a second half of a frame rail, the second half of the frame rail having a hole pattern corresponding at least in part to the hole pattern of the first half of the frame rail, providing a spacer, the spacer having a projection, providing a tooling pin having a chamfered portion and a pin section, positioning the first half of the frame rail and the tooling pin such that the pin section of the tooling pin extends through at least one of the holes having a perimeter in the first half of the frame rail, positioning the spacer and the pin tool such that the projection of the spacer is adjacent the chamfered portion of the pin tool, and applying force to the spacer so as to force the projection of the spacer against the chamfered portion of the pin tool.

In one embodiment, forcing the projection of the spacer against the chamfered portion of the pin tool presses the projection against the perimeter of a hole in the first half of the frame rail. In some embodiments, the contact between the projection and the perimeter of the hole in the first half of the frame rail secures the spacer to the first half of the frame rail.

In certain embodiments, the spacer includes a bore and the method further includes the step of positioning the spacer and the pin tool such that the pin section extends into the bore.

In other embodiments, the spacer includes a second projection and the method further includes the step of positioning the second half of the frame rail and the tooling pin such that the second projection extends into one of the holes in the second half of the frame rail and the pin section extends through at least one of the holes in the second half of the frame rail. In certain embodiments, the method further includes the step of securing the first half of the frame rail to the second half of the frame rail.

Other features of the present invention will be apparent from the following description of embodiments of the invention and the accompanying drawings.

BRIEF DESCRIPTIONS OF THE DRAWINGS

The detailed description particularly refers to the accompanying figures in which.

DETAILED DESCRIPTION OF EMBODIMENTS OF THE INVENTION

Figure 1:
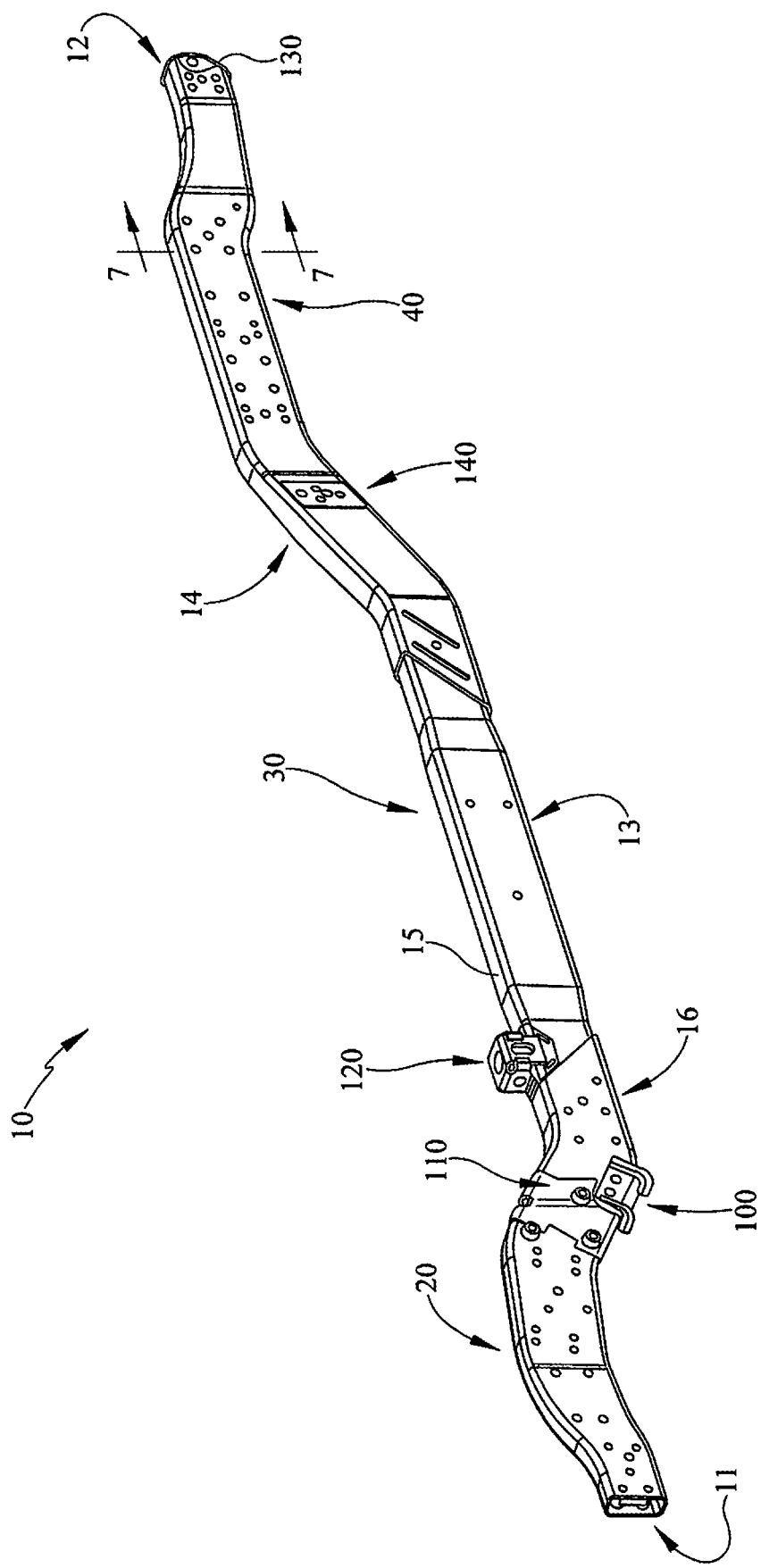
FIG. 1 is a perspective view of a vehicle frame rail according to one embodiment of the present invention.

FIG. 1 is a perspective view of a vehicle frame rail 10 according to one embodiment of the present invention.

Frame rail 10 is intended for use on the left hand side of a vehicle. However, frame rail 10 could also be used on the right hand side of a vehicle. Alternatively, frame rail 10 can be utilized on the left hand side of a vehicle and a mirror image of frame rail 10 can be utilized on the right hand side of a vehicle. The features of frame rail 10 and the principals disclosed herein are equally applicable to left hand side and right hand side frame rails. Frame rail 10 has a first or front end 11, a second or rear end 12, a first or outer side 13, a second or inner side 14, an upper surface 15, and a lower surface 16. Frame rail 10 in the embodiment shown includes a first or front rail section 20, a second or center rail section 30 and a third or rear rail section 40.

Figure 2:
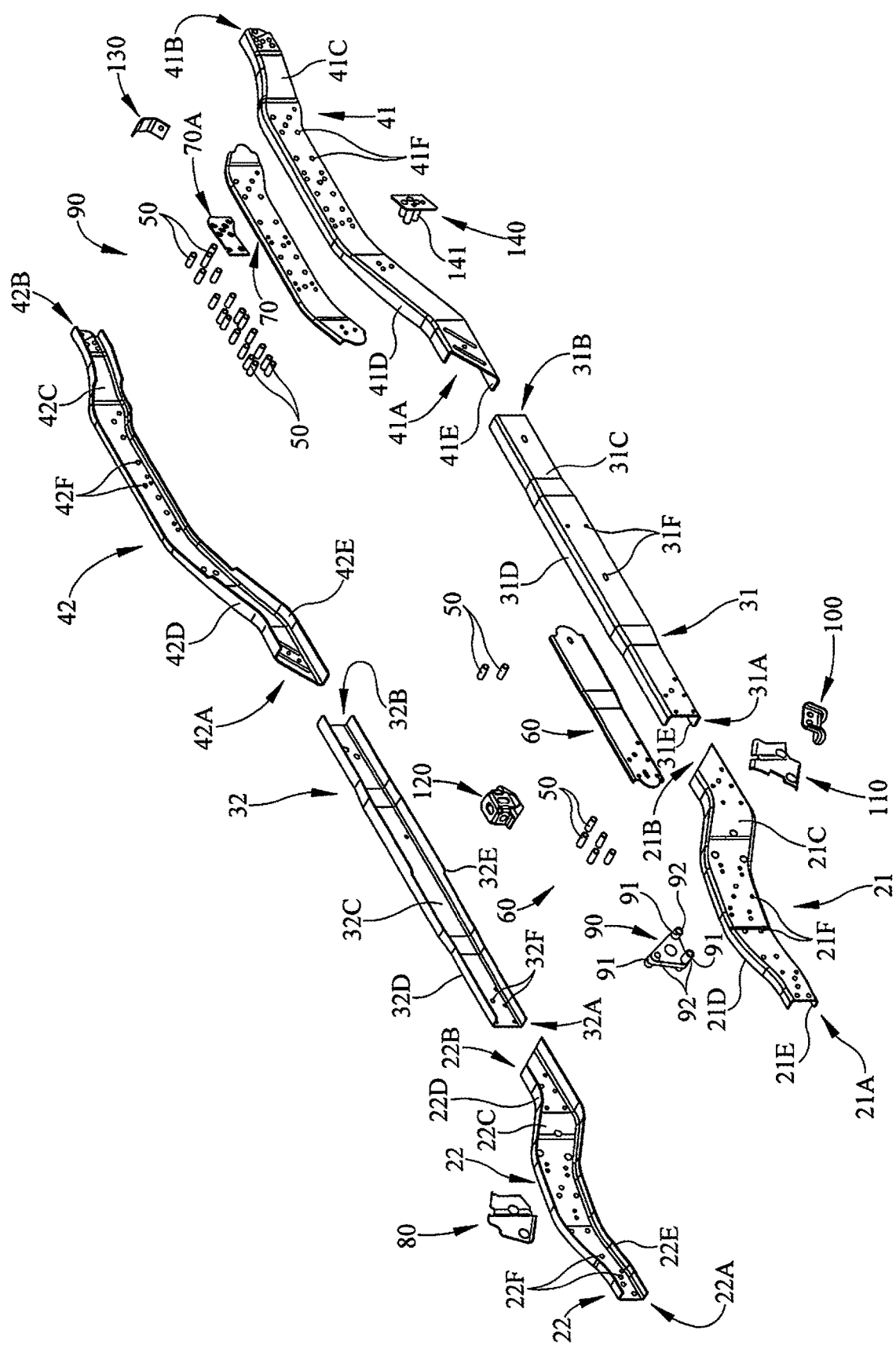
FIG. 2 is an exploded perspective view of the vehicle frame rail shown in FIG. 1.

FIG. 2 is an exploded perspective view of vehicle frame rail 10 shown in FIG. 1. As shown in FIG. 2, front rail section 20 includes a first or outer section 21 and a second or inner section 22. First section 21 of front rail section 20 has a first end 21A and a second end 21B. First section 21 in the embodiment shown is a generally C-shaped member having a central section 21C that is substantially perpendicular to a first section or flange 21D and a second section or flange 21E. First flange 21D and second flange 21E extend toward second section 22 of front rail section 20. First section 21 further includes one or more openings or holes 21F arranged in one or more hole patterns.

As used in this specification a "hole pattern" is a grouping of two or more holes. A single component of frame rails according to embodiments of the invention may include multiple hole patterns. For example, all of the holes 21F in first section 21 constitute a first hole pattern. The first two holes 21F adjacent front end 21A of first section 21 constitute a second hole pattern. Holes need not be adjacent one another to constitute a hole pattern.

Second section 22 of front rail section 20 has a first end 22A and a second end 22B. Second section 22 in the embodiment shown is a generally C-shaped member having a central section 22C that is substantially perpendicular to a first section or flange 22D and a second section or flange 22E. First flange 22D and second flange 22E extend toward first section 21 of front rail section 20. Second section 22 further includes one or more openings or holes 22F arranged in one or more hole patterns that correspond at least in part to a portion of one or more of the hole patterns in first section 21 of front rail section 20.

As also shown in FIG. 2, center rail section 30 includes a first or outer section 31 and a second or inner section 32. First section 31 of center rail section 30 has a first end 31A and a second end 31B. First section 31 in the embodiment shown is a generally C-shaped member having a central section 31C that is substantially perpendicular to a first section or flange 31D and a second section or flange 31E. First flange 31D and second flange 31E extend toward second section 32 of center rail section 30. First section 31 further includes one or more openings or holes 31F arranged in one or more hole patterns.

Second section 32 of center rail section 30 has a first end 32A and a second end 32B. Second section 32 in the embodiment shown is a generally C-shaped member having a central section 32C that is substantially perpendicular to a first section or flange 32D and a second section or flange 32E. First flange 32D and second flange 32E extend toward first section 31 of center rail section 30. Second section 32 further includes one or more openings or holes 32F arranged in one or more hole patterns that correspond at least in part to a portion of one or more of the hole patterns in first section 31 of center rail section 30.

As further shown in FIG. 2, rear rail section 40 includes a first or outer section 41 and a second or inner section 42. First section 41 of rear rail section 40 has a first end 41A and a second end 41B. First section 41 in the embodiment shown is a generally C-shaped member having a central section 41C that is substantially perpendicular to a first section or flange 41D and a second section or flange 41E. First flange 41D and second flange 41E extend toward second section 42 of rear rail section 40. First section 41 further includes one or more openings or holes 41F arranged in one or more hole patterns.

Second section 42 of rear rail section 40 has a first end 42A and a second end 42B. Second section 42 in the embodiment shown is a generally C-shaped member having a central section 42C that is substantially perpendicular to a first section or flange 42D and a second section or flange 42E. First flange 42D and second flange 42E extend toward first section 41 of rear rail section 40. Second section 42 further includes one or more openings or holes 42F arranged in a hole pattern that correspond at least in part to a portion of one or more of the hole patterns in first section 41 of rear rail section 40.

Figure 3:
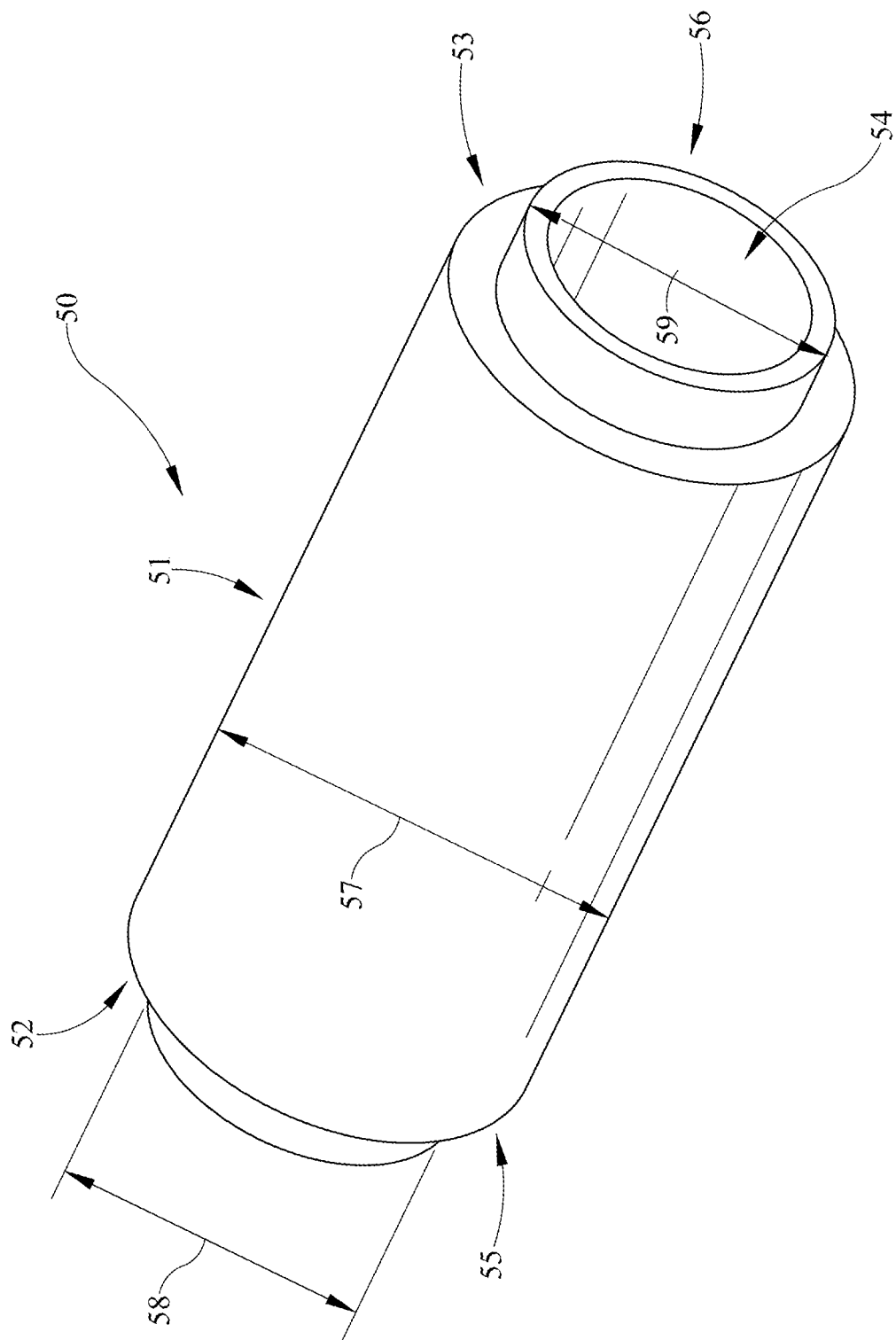
FIG. 3 is a perspective view of a spacer that is a component of the vehicle frame rail shown in FIG. 1.

As shown in FIGS. 2 and 3, frame rail 10 further includes a plurality of spacers 50. Each spacer 50 includes a main body portion 51 having a first end 52 and a second end 53, a through bore 54, a first stepped portion formed by a first projection 55 surrounding through bore 54 and extending from first end 52 of main body portion 51, and a second stepped portion formed by a second projection 56 surrounding through bore 54 and extending from second end 53. In the illustrative embodiment, spacer 50, main body portion 51, first projection 55, and second projection 56 are cylindrical. Main body portion 51 extends axially over a majority of the axial length of spacer 50 and has a first diameter 57. First projection 55 extends axially away from first end 52 of main body portion 51 and has a second diameter 58 that is smaller than first diameter 57 of main body portion 51. Second projection 56 extends axially away from second end 53 of main body portion 51 and has a third diameter 59 that is smaller than first diameter 57 of main body portion 51. Second diameter 58 and third diameter 59 are sized to correspond with holes 21F, 22F, 31F, 32F, 41F, and 42F such that first projection 55 and second projection 56 may be inserted into holes 21F, 22F, 31F, 32F, 41F, 42F.

Figure 4:
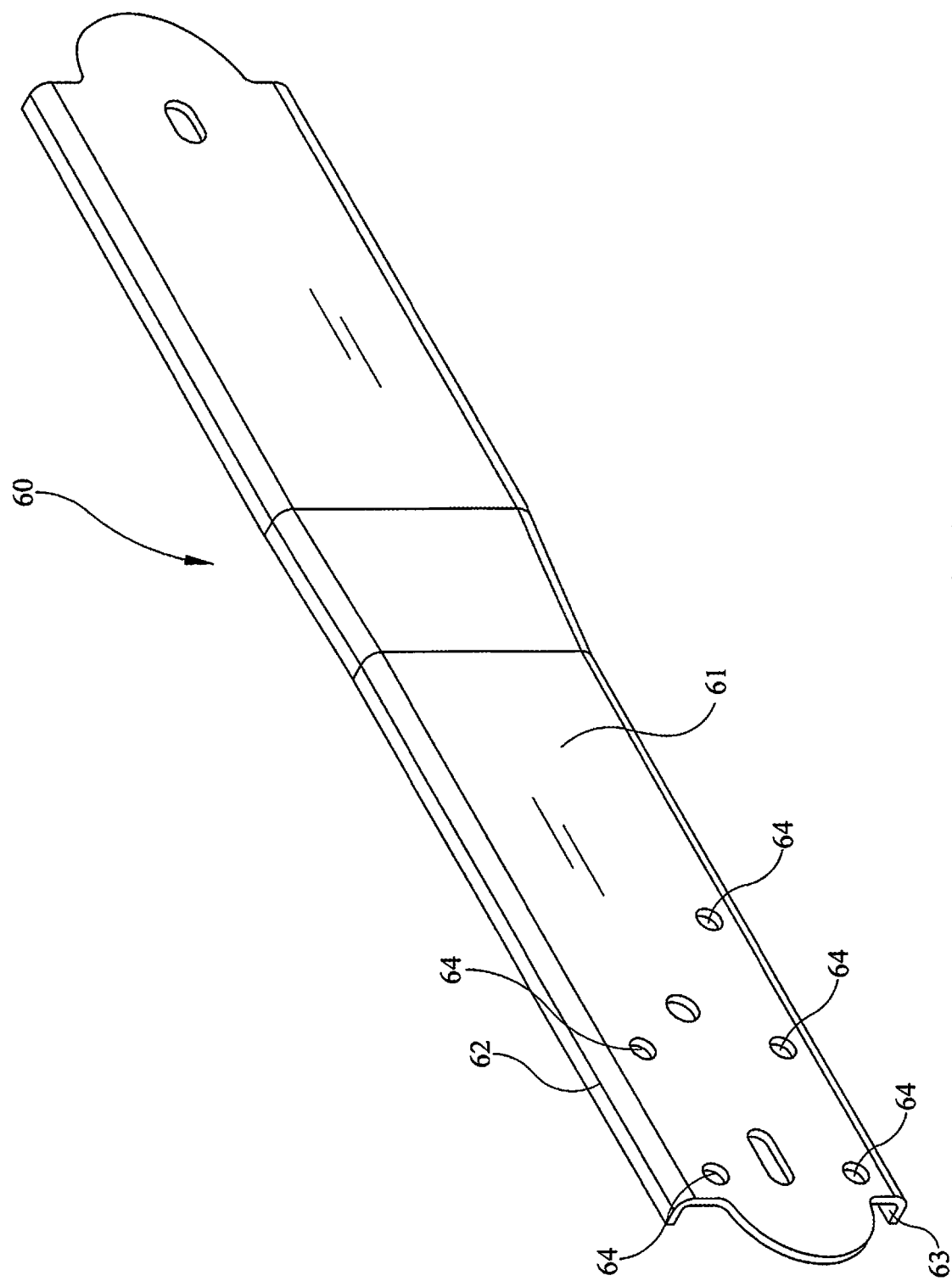
FIG. 4 is a perspective view of a first reinforcing member that is a component of the vehicle frame rail shown in FIG. 1.

As also shown in FIG. 2, frame rail 10 in the embodiment shown includes a first reinforcing member 60, a second reinforcing member 70, and a third reinforcing member 70A. First reinforcing member 60 (FIG. 4) includes a main or body section 61, a first flange 62 extending generally perpendicular to and along one side of body section 61, a second flange 63 extending generally perpendicular to and along one side of body section 61, and one or more openings or holes 64 arranged in one or more hole patterns.

Figure 4A:
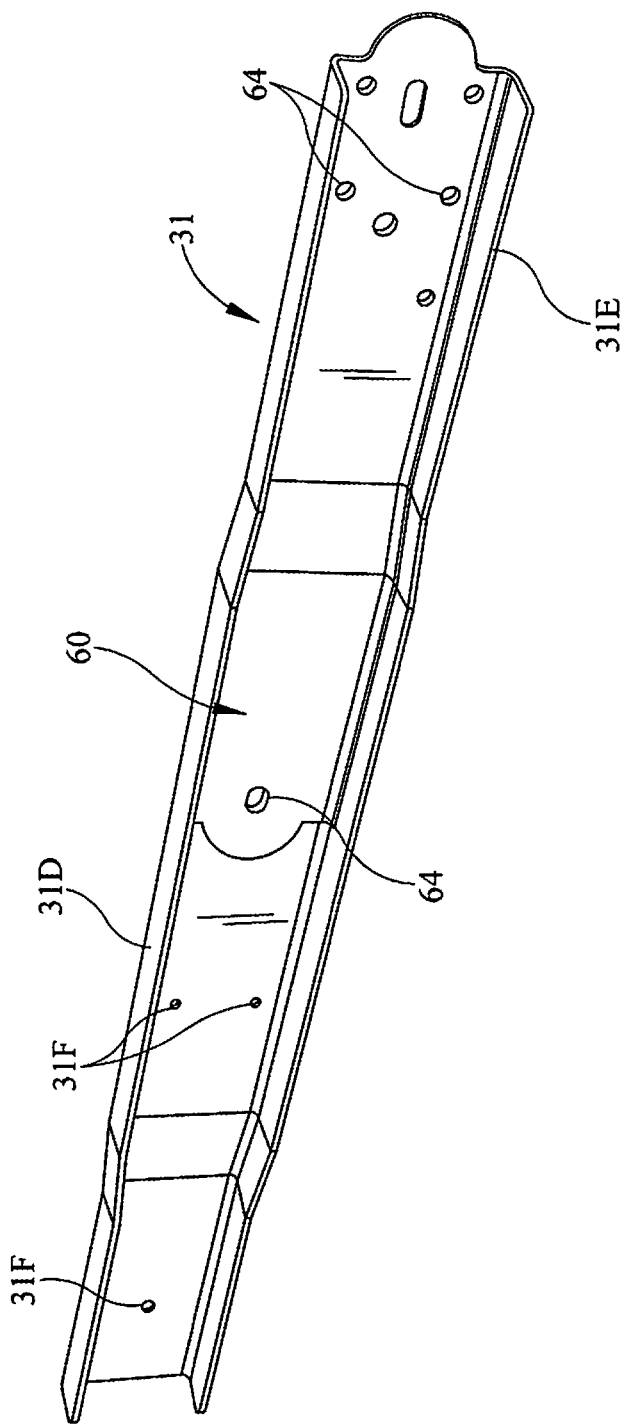
FIG. 4A is a right side perspective view of a frame rail section and reinforcing member that are components of the vehicle frame rail shown in FIG. 1 according to one embodiment of the present invention.

As shown in FIG. 4A, first reinforcing member 60 and first section 31 of center rail section 30 are formed as a unitary component. Alternatively, first reinforcing member 60 and first section 31 of center rail section 30 can be formed as individual components for later assembly. Regardless of the manner and order of assembly, one or more holes 64 in first reinforcing member 60 align with one or more holes 31F in first section 31 of center rail section 30.

Figure 5:
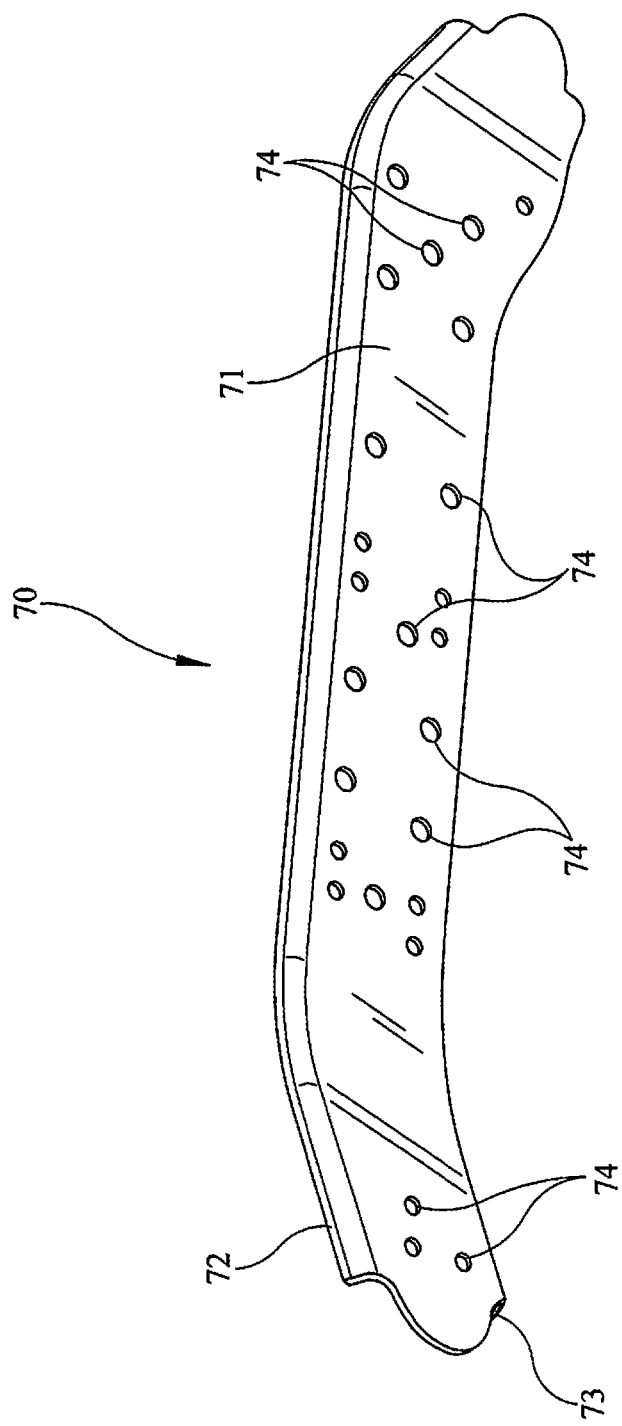
FIG. 5 is a perspective view of a second reinforcing member that is a component of the vehicle frame rail shown in FIG. 1.

Referring to FIG. 5, second reinforcing member 70 includes a main or body section 71, a first flange 72 extending generally perpendicular to and along one side of body section 71, a second flange 73 extending generally perpendicular to and along one side of body section 71, and one or more openings or holes 74 arranged in one or more hole patterns.

Figure 5A:
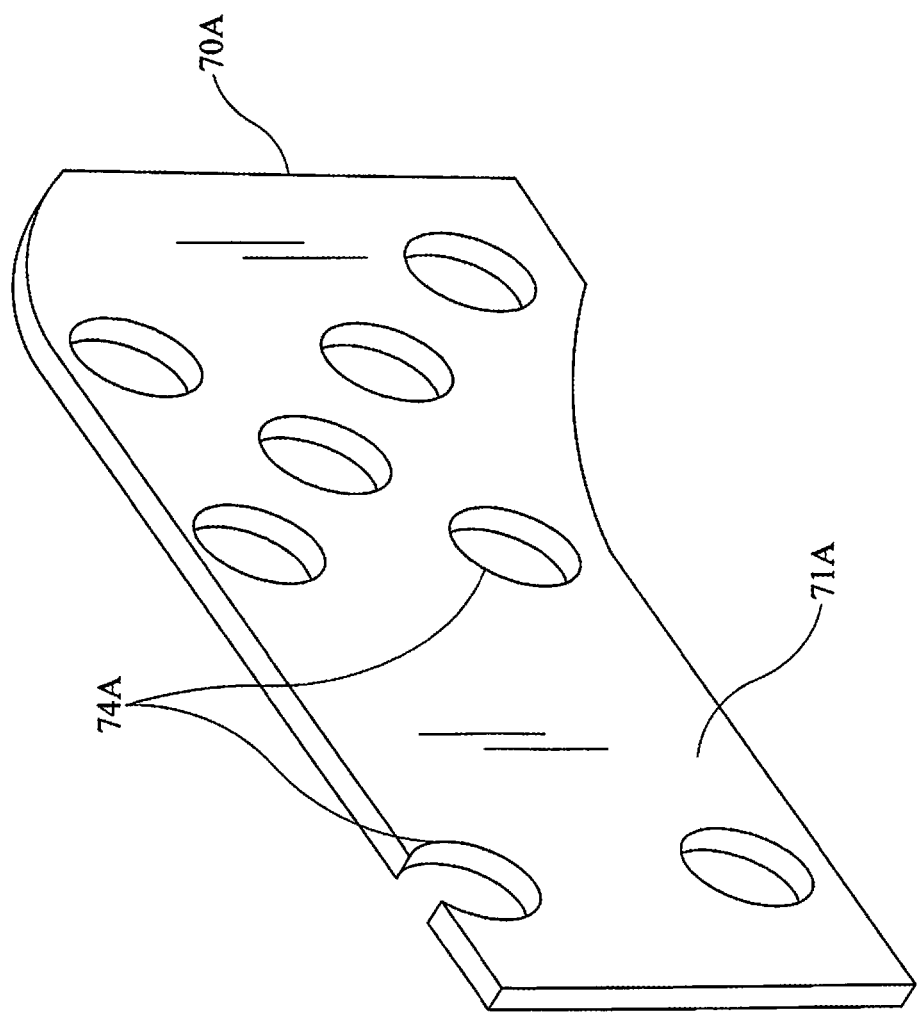
FIG. 5A is a perspective view of a third reinforcing member that is a component of the vehicle frame rail shown in FIG. 1.

Referring to FIG. 5A, third reinforcing member 70A is a generally planar member having a main or body section 71A and one or more openings or holes 74A arranged in one or more hole patterns.

Figure 5B:
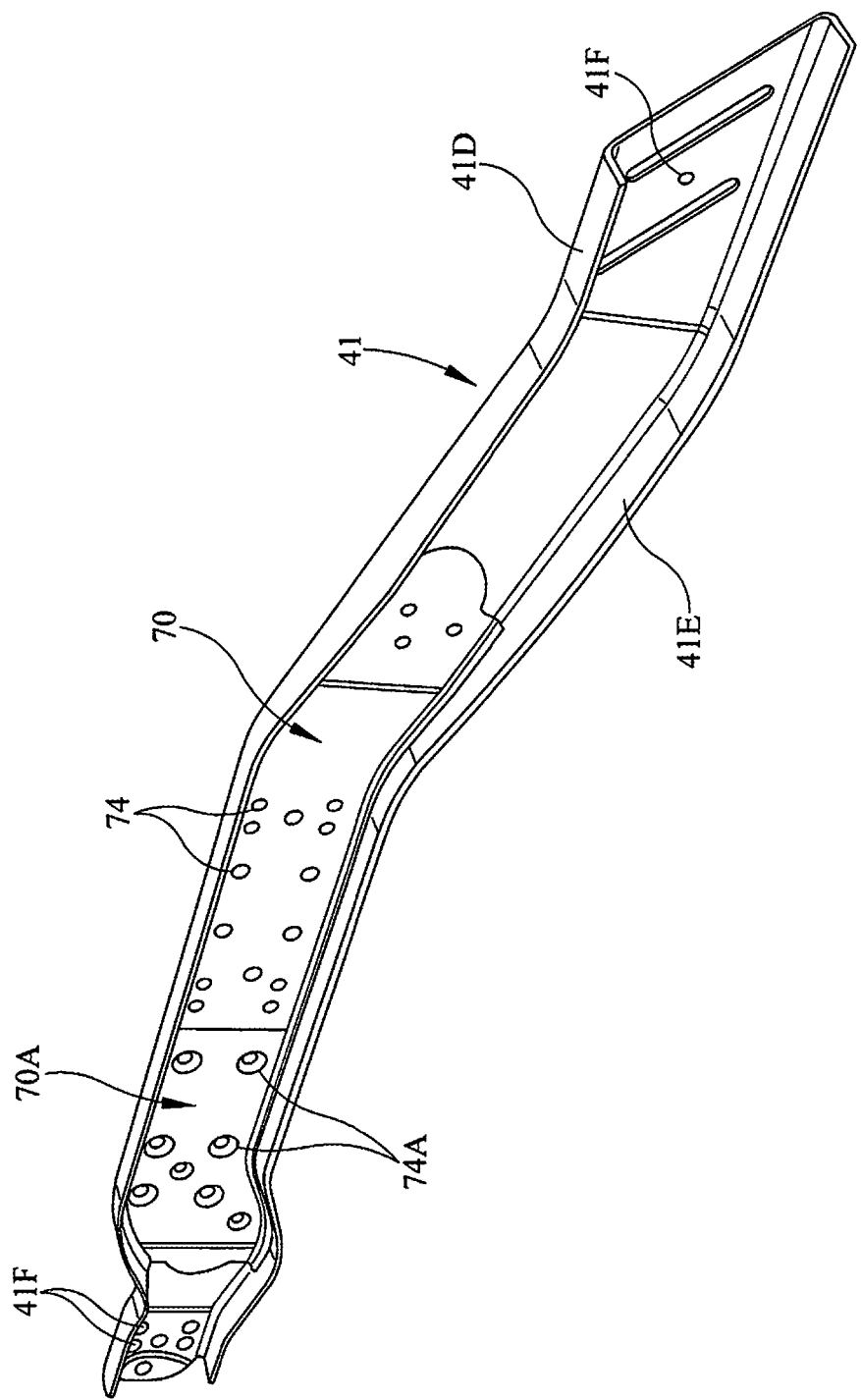
FIG. 5B is a right side perspective view of a frame rail section and reinforcing members that are components of the vehicle frame rail shown in FIG. 1 according to one embodiment of the present invention.

As shown in FIG. 5B, second reinforcing member 70, third reinforcing member 70A, and first section 41 of rear rail section 40 are formed as a unitary component. Alternatively, second reinforcing member 70, third reinforcing member 70A, and first section 41 of rear rail section 40 can be formed as individual components for later assembly. Regardless of the manner and order of assembly, one or more holes 74 in second reinforcing member 70 align with one or more holes 41F in first section 41 of rear rail section 40. Similarly, one or more holes 74A of third reinforcing member 74 align with one or more holes 74 in second reinforcing member 70 and/or with one or more holes 41F in first section 41 of rear rail section 40.

As further shown in FIG. 2, frame rail 10 includes one or more brackets and/or reinforcing members. In the embodiment shown in FIG. 2, frame rail 10 includes a steering gear reinforcement 80, a steering gear bracket 90, a stabilizer bar attachment bracket 100, a steering gear reinforcement 110, a body mount bracket 120, a frame rail end plate 130, and a body mount reinforcement 140. In the embodiment shown, steering gear bracket 90 includes one or more posts 91, each of which includes a bore 92 sized to receive a fastener, such as a bolt. Body mount reinforcement 140 also includes one or more posts 141, each of which includes a bore 142 sized to receive a fastener, such as a bolt.

Figure 6:
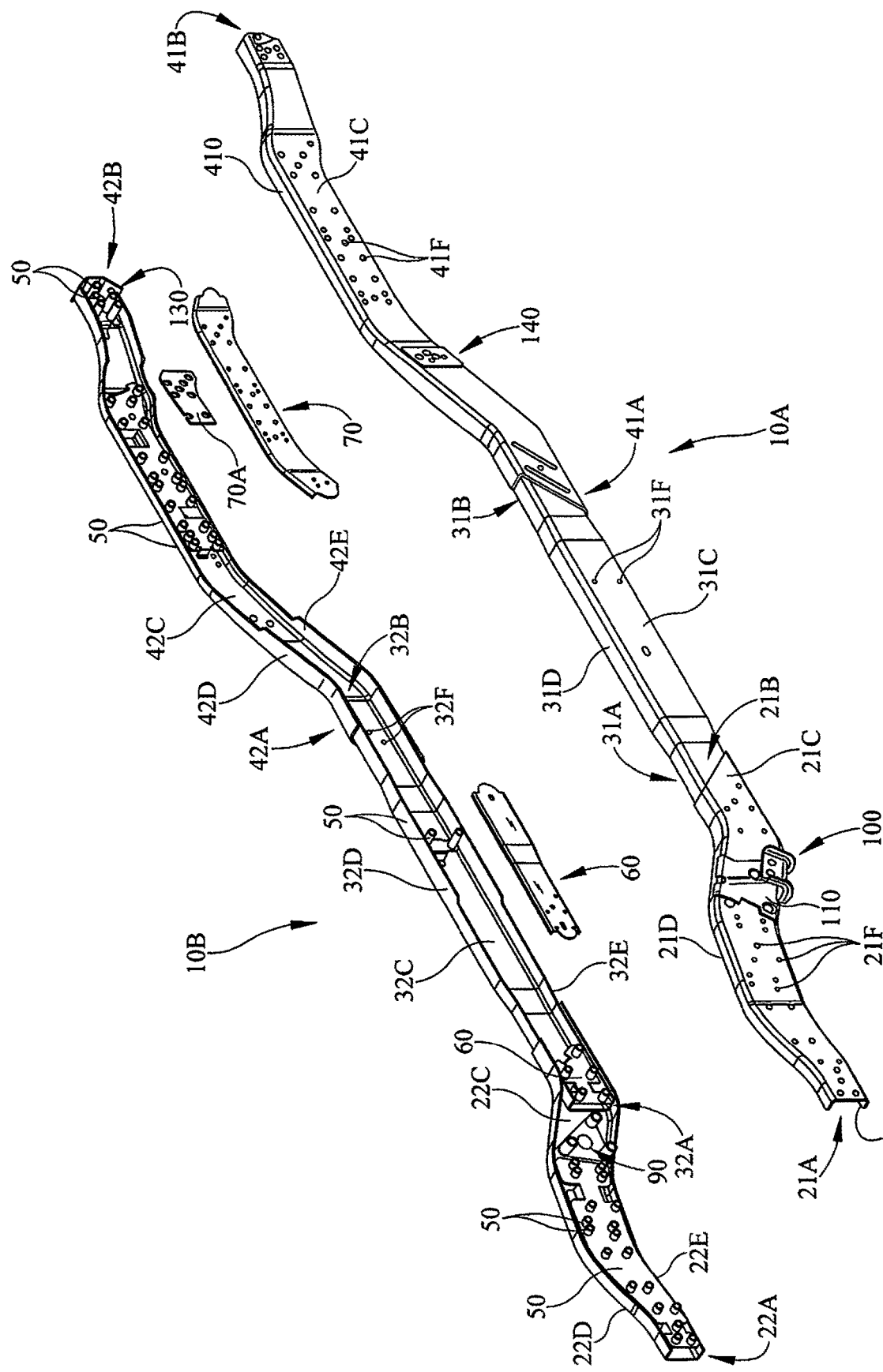
FIG. 6 is a perspective view illustrating an assembly step according to one embodiment of the present invention for vehicle frame rail shown in FIG. 1.

Referring to FIG. 6, in one embodiment of the present invention, frame rail 10 is assembled by overlapping second end 21B of first section 21 of front rail section 20 with first end 31A of first section 31 of center rail section 30 such that a portion of first section 31 is nested within first section 21 between first flange 21D and second flange 21E of first section 21. Note that in the embodiment shown, several holes 21F in first section 21 and several holes 64 in first reinforcing member 60 align with several holes 31F in first section 31 in the area of overlap. First section 21 and first section 31 are then welded together or secured together by other means. Similarly, second end 31B of first section 31 of center rail section 30 is overlapped with first end 41A of first section 41 of rear rail section 40 such that a portion of first section 31 is nested within first section 41 between first flange 41D and second flange 41E. First section 31 and first section 41 are then welded together or secured together by other means. This forms a first half or outer frame rail side 10A of frame rail 10 as shown in FIG. 6.

Second end 22B of second section 22 of front rail section 20 is overlapped with first end 32A of second section 32 of center rail section 30 such that a portion of second section 32 is nested within second section 22 between first flange 22D and second flange 22E of second section 22. Note that in the embodiment shown, several holes 22F in second section 22 align with several holes 32F in second section 32 in the area of overlap. Second section 22 and second section 32 are then welded together or secured together by other means. Similarly, second end 32B of second section 32 of center rail section 30 is overlapped with first end 42A of second section 42 of rear rail section 40 such that a portion of second section 32 is nested within second section 42 between first flange 42D and second flange 42E. Second section 32 and second section 42 are then welded together or secured together by other means. This forms a second half or inner frame rail side 10B of frame rail 10 as shown in FIG. 6.

Steering gear bracket 90 and frame rail end plate 130 are then secured to either first half 10A or second half 10B of frame rail 10. FIG. 6 shows steering gear bracket 90 and frame rail end plate 130 positioned on and secured to second half 10B. Steering gear bracket 90 and frame rail end plate 130 may be secured to, for example, second half 10B by any of various means, including, for example, by welding. Steering gear bracket 90 is also positioned on second section 22 of front rail section 20 such that one or more bores 92 in posts 91 are aligned with one or more holes 22F in second section 22.

Figure 9A:
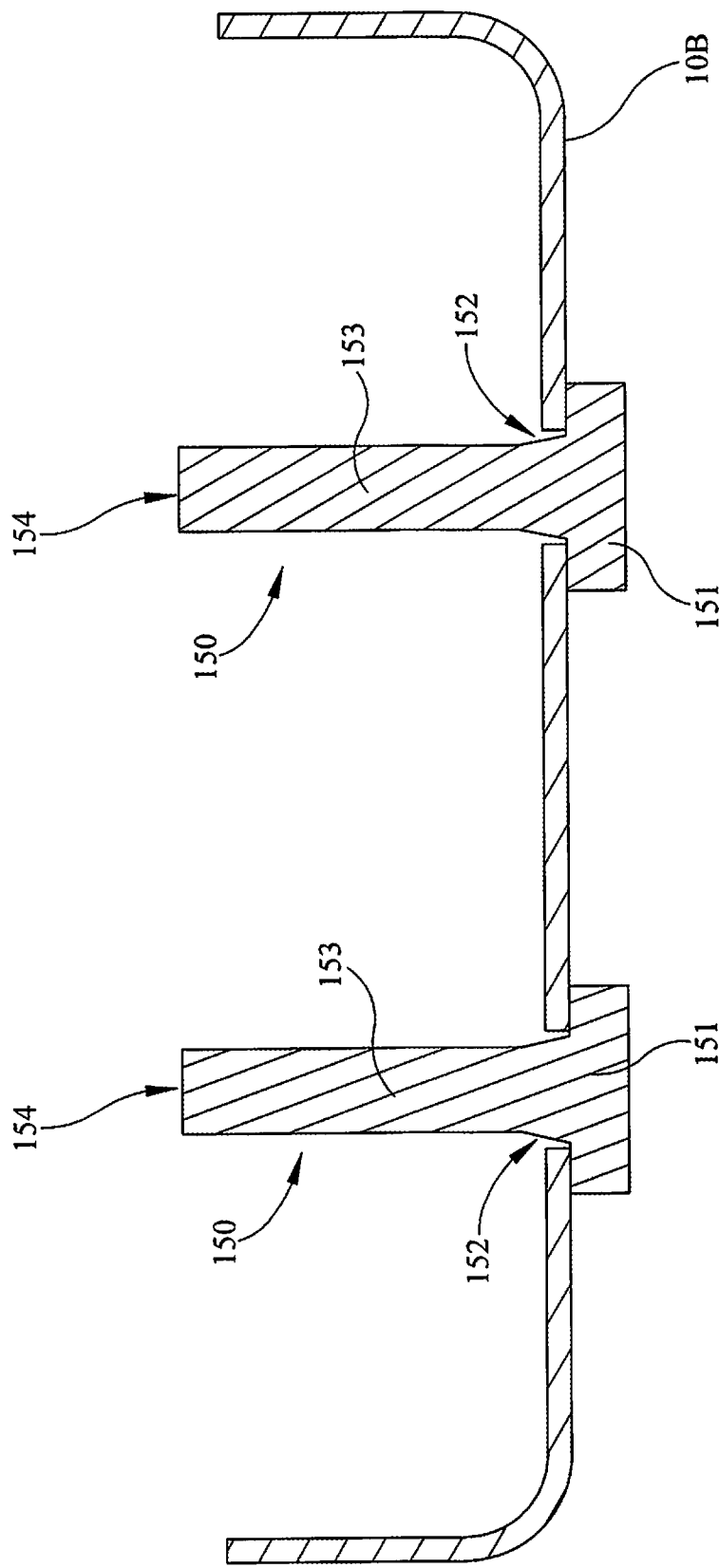
FIG. 9A is a side view illustrating a step in the method of assembling the vehicle frame rail shown in FIG. 1 according to an embodiment of the present invention.

As shown in FIGS. 9A-9D, second half 10B is then placed over one or more tooling pins 150 such that each tooling pin 150 extends through one of holes 22F, 32F, and 42F in the direction of flanges 22D, 22E, 32D, 32E, 42D and 42E. Each tooling pin 150 includes a base 151, a chamfered portion 152, a pin section 153, and an end 154. The outer surface of second half 10B rests on base 151 of tooling pins 150 such that chamfered portion 152 of each tooling pin 150 extends upwardly into the corresponding hole as shown in FIG. 9A.

Figure 9B:
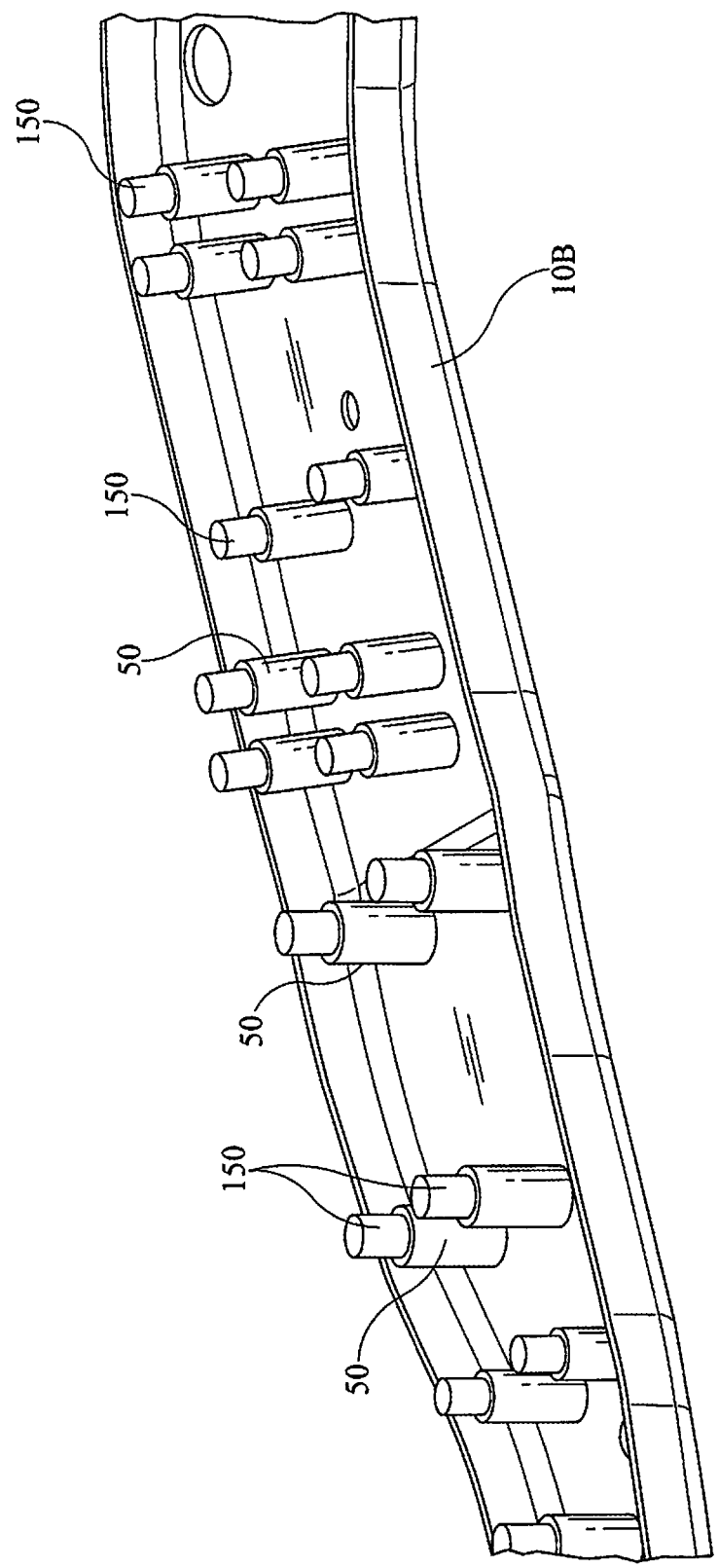
FIG. 9B is a perspective view illustrating a step in the method of assembling the vehicle frame rail shown in FIG. 1 according to an embodiment of the present invention.
Figure 9C:
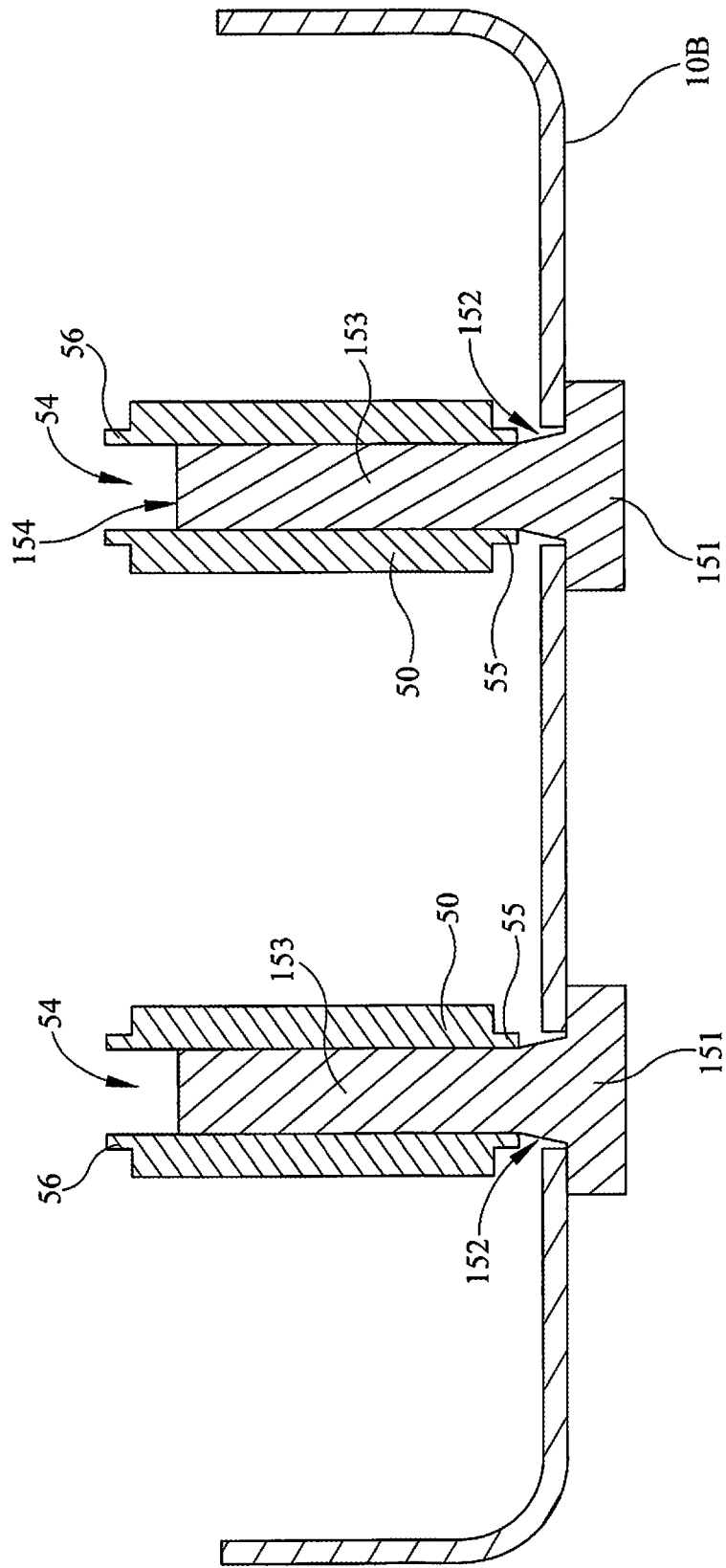
FIG. 9C is a side view illustrating a step in the method of assembling the vehicle frame rail shown in FIG. 1 according to an embodiment of the present invention.
Figure 9D:
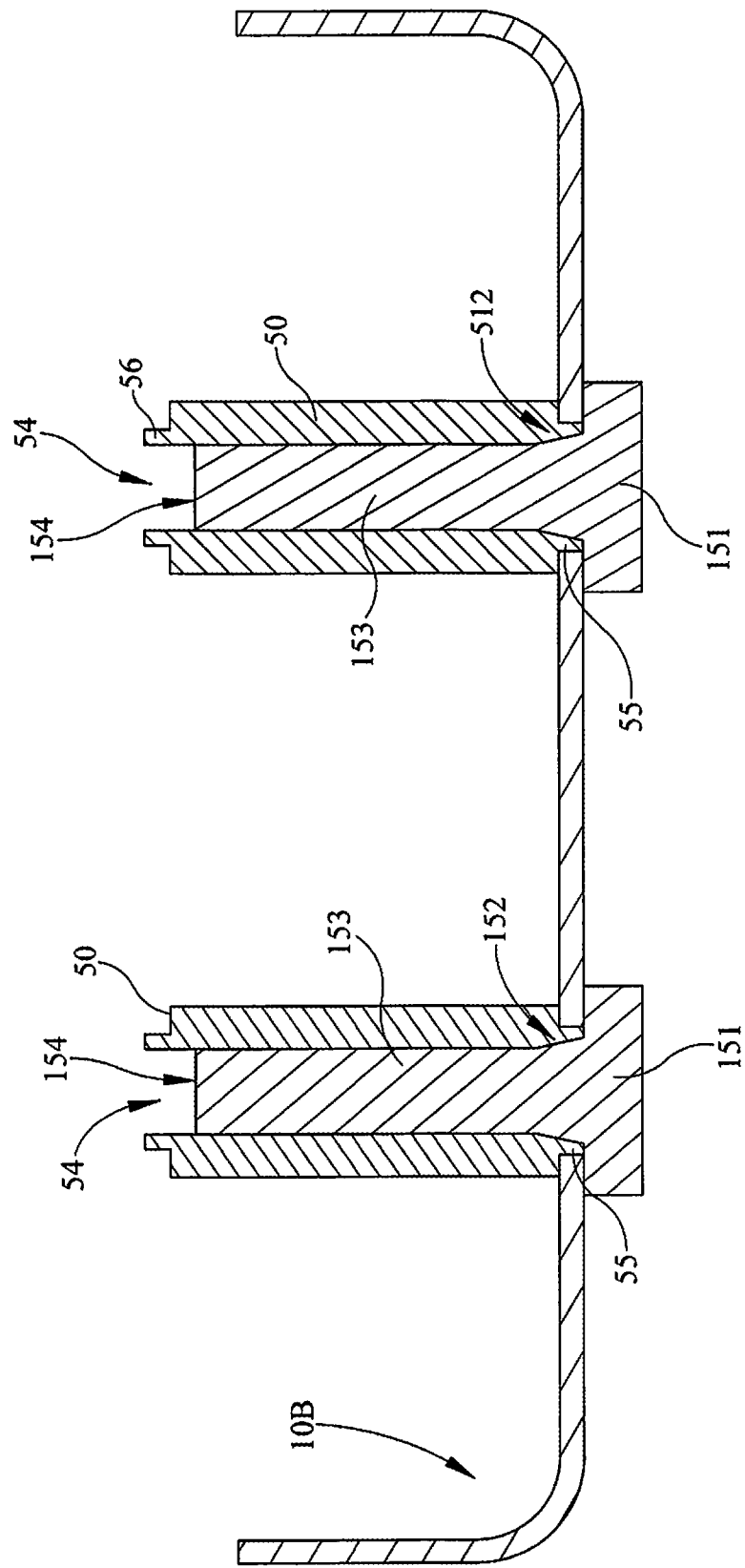
FIG. 9D is a side view illustrating a step in the method of assembling the vehicle frame rail shown in FIG. 1 according to an embodiment of the present invention.

Spacers 50 are then positioned in one or more of holes 22F, 32F, and 42F. For example, as shown in FIGS. 9B and 9C, through bore 54 of each spacer 50 is slid over a respective pin section 153 of a respective tooling pin 150 such that first projection 55, for example, extends into the hole and contacts chamfered portion 152. Each spacer 50 is then hammered (for example, by applying force to the opposite end of spacer 50 with a press) toward the respective chamfered portion 152 of the respective tooling pin 150 such that first projection 55 is splayed-outwardly toward the circumference of the hole and creates a mechanical lock between the spacer 50 and second half 10B. (FIG. 9D).

Figure 7:
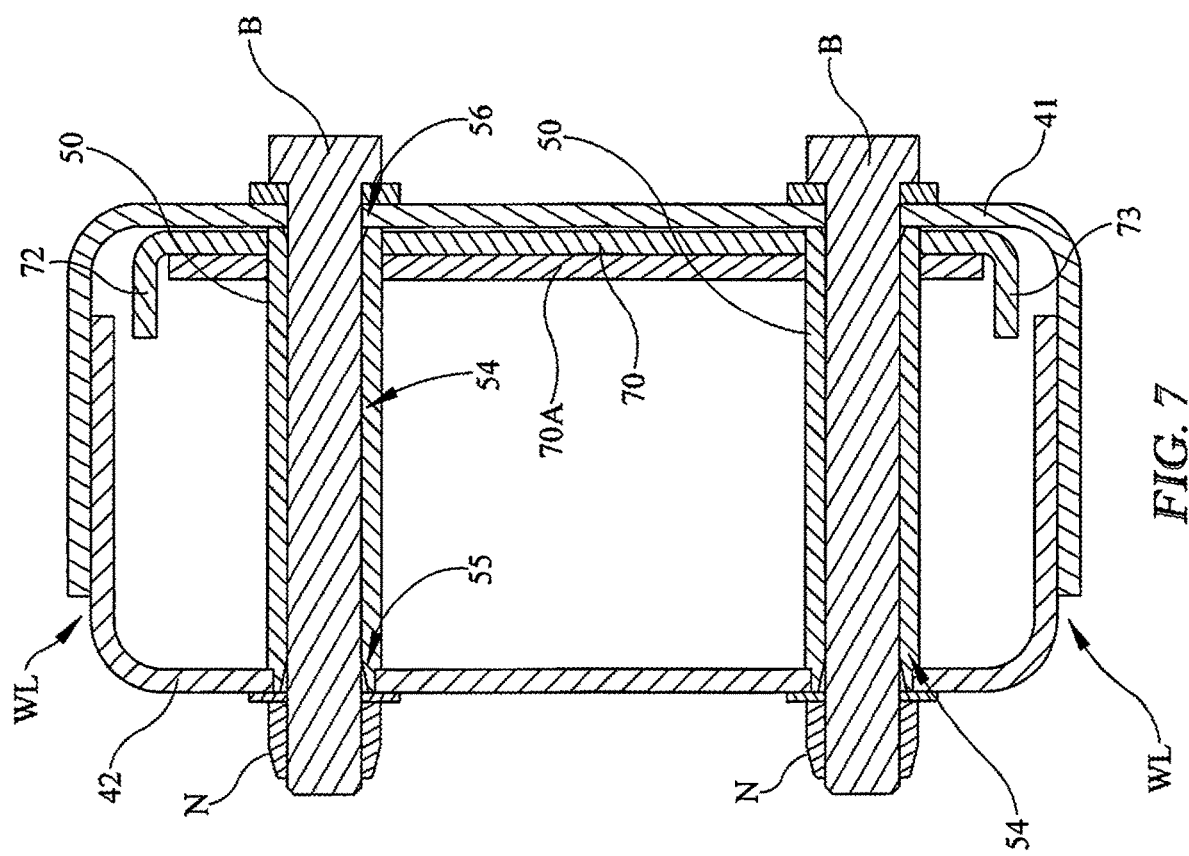
FIG. 7 is a sectional view taken along line 7-7 in FIG. 1.

First half 10A is then positioned over second half 10B such that second projections 56 extend into one of the corresponding holes 64, 74, 74A, 21F, 31F, and/or 41F, depending on the location of the particular spacer 50. A force, such as a clamping force, is then applied to first half 10A and second half 10B, and first half 10A and second half 10B are then secured together, such as by welding along the outer edges of first half 10A and second half 10B at weld lines or locations WL so as to form an enclosed space between first half 10A and second half 10B. Note that in the embodiment shown, second half 10B is nested within first half 10A. (FIG. 7).

Steering gear reinforcement 80, stabilizer bar attachment bracket 100, steering gear reinforcement 110, body mount bracket 120, frame rail end plate 130, and body mount reinforcement 140 can then be secured to first half 10A and second half 10B in the locations shown in FIG. 1. Note that posts 141 of body mount reinforcement 140 extend through holes 41F on first section 41 of rear rail section 40. Bolts or other fasteners may be used to connect frame rail 10 to a vehicle body and other components, including, for example, via steering gear reinforcement 80, steering gear bracket 90, stabilizer bar attachment bracket 100, steering gear reinforcement 110, body mount bracket 120, frame rail end plate 130, and body mount reinforcement 140. For example, FIG. 7 illustrates two bolts B extending through openings 41F in first section 41 of rear rail section 40, openings 74 in second reinforcing member 70, bores 54 in spacers 50, and openings 42F in second section 42 of rear rail section 40. Nuts N or other securement means can be used to retain bolts B to frame rail 10. Spacers 50 provide support to frame rail 10 at the fastening locations and resist the clamping forces of bolts B and nuts N.

Figure 8:
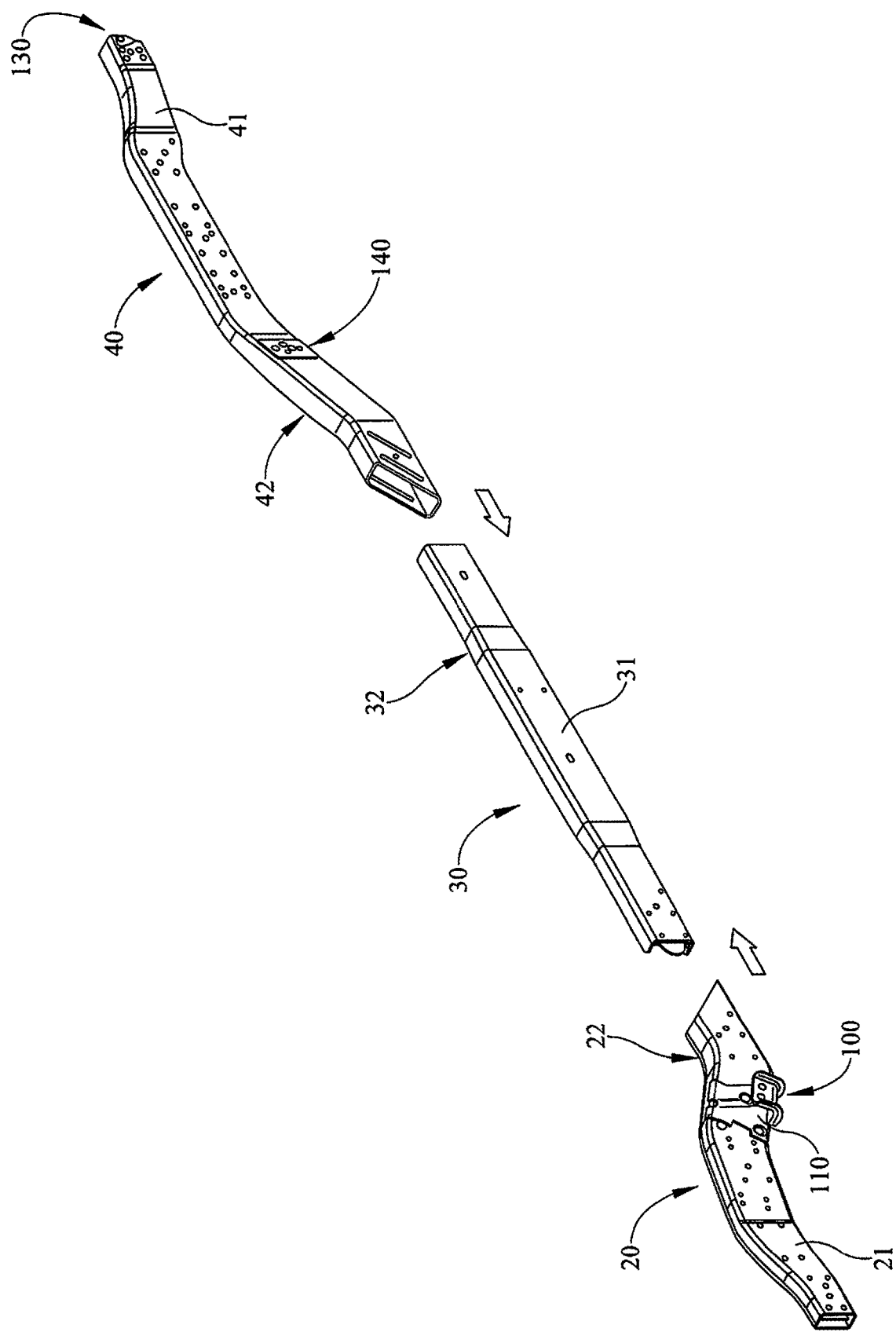
FIG. 8 is a perspective view illustrating an assembly step according to another embodiment of the present invention for vehicle frame rail shown in FIG. 1.

In another embodiment of the invention, frame rail 10 is assembled by first forming front rail section 20, center rail section 30 and rear rail section 40, and then connecting center rail section 30 to front rail section 20 and rear rail section 40. For example, front rail section 20 can be formed by securing spacers 50 and other components within first section 21 and second section 22 of front rail section 20 as described above and then securing first section 21 and second section 22 together. Center rail section 30 and rear rail section 40 can be assembled in the same manner. Opposite ends of center rail section 30 are then slid into one end of front rail section 20 and one end of rear rail section 40, respectively, and the sections are welded together. (FIG. 8).

Although various embodiments of the invention have been shown and described in detail the same is to be taken by way of example only and is not a limitation on the scope of the invention. Numerous modifications can be made to the embodiments disclosed without departing from the scope of the invention. For example, one or more of first reinforcing member 60, second reinforcing member 70, and third reinforcing member 70A can be eliminated from the embodiments described above, and spacers 50 can be connected to frame rail half 10B by the methods described above. Furthermore, chamfered tooling pins or other tooling could be used to form a mechanical lock between spacers 50 and frame rail half 10A, or between spacers 50 and both frame rail half 10A and frame rail half 10B. Additional reinforcing members can be added to the embodiments. In other embodiments, hole patterns other than those illustrated can be utilized. The shape of the reinforcing members, as well as the positioning of the reinforcing members, can also be other than those specifically illustrated. The order of the assembly steps can also be varied. Other modifications to the embodiments described and illustrated are also within the scope of the invention.

What is claimed:

1. A vehicle frame rail, including:
   a front rail section, the front rail section having a first end, a second end, a first section and a second section, the first section having a central section, a first flange extending from the central section, a second flange extending from the central section, and a hole pattern, the second section having a central section, a first flange extending from the central section, a second flange extending from the central section, and a hole pattern corresponding at least in part to the hole pattern in the first section, the first flange of the first section extending toward and connected to the first flange of the second section and the second flange of the first section extending toward and connected to the second flange of the second section such that the hole pattern of the first section and the hole pattern of the second section are at least partially aligned and so as to form an enclosed space between the first and second sections;
   a center rail section, the center rail section having a first end connected to the second end of the front rail section, a second end, a first section and a second section, the first section having a central section, a first flange extending from the central section, a second flange extending from the central section, and a hole pattern, the second section having a central section, a first flange extending from the central section, a second flange extending from the central section, and a hole pattern corresponding at least in part to the hole pattern in the first section, the first flange of the first section extending toward and connected to the first flange of the second section and the second flange of the first section extending toward and connected to the second flange of the second section such that the hole pattern of the first section and the hole pattern of the second section are at least partially aligned and so as to form an enclosed space between the first and second sections;
   a rear rail section, the rear rail section having a first end connected to the second end of the center rail section, a second end, a first section and a second section, the first section having a central section, a first flange extending from the central section, a second flange extending from the central section, and a hole pattern, the second section having a central section, a first flange extending from the central section, a second flange extending from the central section, and a hole pattern corresponding at least in part to the hole pattern in the first section, the first flange of the first section extending toward and connected to the first flange of the second section and the second flange of the first section extending toward and connected to the second flange of the second section such that the hole pattern of the first section and the hole pattern of the second section are at least partially aligned and so as to form an enclosed space between the first and second sections; and
   a plurality of spacers, each spacer having a first end, a second end, a first projection extending from the first end, a second projection extending from the second end, and a bore extending from the first end to the second end, the diameter of the bore at the first end being larger than the diameter of the bore between the first end and the second end, a first one of the plurality of spacers located such that the first projection extends into one of the holes in the first section of the front rail section and is secured to the hole in the first section of the front rail section by a chamfered tool and the second projection extends into one of the holes in the second section of the front rail section, a second one of the plurality of spacers located such that the first projection extends into one of the holes in the first section of the center rail section and is secured to the hole in the first section of the center rail section by a chamfered tool and the second projection extends into one of the holes in the second section of the center rail section, and a third one of the plurality of spacers located such that the first projection extends into one of the holes in the first section of the rear rail section and is secured to the hole in the first section of the rear rail section by a chamfered tool and the second projection extends into one of the holes in the second section of the rear rail section.

2. The vehicle frame rail according to claim 1, wherein the first projection of at least one of the plurality of spacers surrounds the bore.

3. The vehicle frame rail according to claim 2, wherein the second projection of the at least one of the plurality of spacers surrounds the bore.

4. The vehicle frame rail according to claim 1, wherein at least one of the plurality of spacers has a main body portion extending from the first end to the second end, the main body portion having a first diameter, and wherein the first projection of the at least one of the plurality of spacers has a second diameter different from the first diameter.

5. The vehicle frame rail according to claim 4, wherein the second diameter is smaller than the first diameter.

6. The vehicle frame rail according to claim 1, wherein the bore of at least one of the plurality of spacers is aligned with one of the holes in the first section of either the front rail section, the center rail section, or the rear rail section.

7. The vehicle frame rail according to claim 6, wherein the bore of the at least one of the plurality of spacers is aligned with one of the holes in the second section of either the front rail section, the center rail section, or the rear rail section.

8. The vehicle frame rail according to claim 1, further including a reinforcing member having a hole pattern corresponding at least in part to the hole pattern in the first and second sections of the center rail section.

9. The vehicle frame rail according to claim 8, wherein at least one of the plurality of spacers extends into one of the holes of the reinforcing member.

10. The vehicle frame rail according to claim 9, wherein the first projection of the at least one of the plurality of spacers extends into one of the holes of the first section of the center rail section.

11. The vehicle frame rail according to claim 9, wherein the first projection of the at least one of the plurality of spacers extends into one of the holes of the first section of the front rail section.

12. A vehicle frame rail, including:
a first half having a hole;
a second half connected to the first half so as to form an enclosed space between the first half and the second half; and
a spacer having a first end, a second end, a first projection extending from the first end, and a bore extending from the first end to the second end, the diameter of the bore at the first end being larger than the diameter of the bore between the first end and the second end, the spacer located in the enclosed space such that the first projection extends into the hole in the first half and is secured to the hole in the first half by a chamfered tool.

13. The vehicle frame rail according to claim 12, wherein the second half includes a hole aligned with the hole in the first half.

14. The vehicle frame rail according to claim 13, wherein the spacer further includes a second projection extending from the second end of the spacer, and the spacer is located in the enclosed space such that the second projection extends into the hole in the second half.

15. The vehicle frame rail according to claim 12, wherein the first projection surrounds the bore.

16. The vehicle frame rail according to claim 14, wherein the second projection surrounds the bore.

17. The vehicle frame rail according to claim 12, wherein the spacer has a main body portion extending from the first end to the second end, the main body portion having a first diameter, and wherein the first projection has a second diameter different from the first diameter.

18. The vehicle frame rail according to claim 17, wherein the second diameter is smaller than the first diameter.

19. The vehicle frame rail according to claim 12, wherein the bore is aligned with the hole in the first half.

20. The vehicle frame rail according to claim 13, wherein the bore is aligned with the hole in the first half and the hole in the second half.

21. The vehicle frame rail according to claim 12, further including a first reinforcing member located in the enclosed space, the first reinforcing member having a hole aligned with the hole in the first half.

22. The vehicle frame rail according to claim 21, wherein the spacer extends into the hole of the first reinforcing member.

23. The vehicle frame rail according to claim 22, wherein the first projection extends into the hole of the first half.

24. A method of manufacturing a vehicle frame rail, including the steps of:
providing a first half of a frame rail, the first half having a hole pattern with at least one of the holes having a perimeter;
providing a second half of a frame rail, the second half of the frame rail having a hole pattern corresponding at least in part to the hole pattern of the first half of the frame rail;
providing a spacer, the spacer having a projection;
providing a tooling pin having a chamfered portion and a pin section;
positioning the first half of the frame rail and the tooling pin such that the pin section of the tooling pin extends through at least one of the holes having a perimeter in the first half of the frame rail;
positioning the spacer and the pin tool such that the projection of the spacer is adjacent the chamfered portion of the pin tool; and
applying force to the spacer so as to force the projection of the spacer against the chamfered portion of the pin tool.

25. The method according to claim 24, wherein forcing the projection of the spacer against the chamfered portion of the pin tool presses the projection against the perimeter of a hole in the first half of the frame rail.

26. The method according to claim 25, wherein the contact between the projection and the perimeter of the hole in the first half of the frame rail secures the spacer to the first half of the frame rail.

27. The method according to claim 24, wherein the spacer includes a bore and further including the step of positioning the spacer and the pin tool such that the pin section extends into the bore.

28. The method according to claim 24, wherein the spacer includes a second projection and further including the step of positioning the second half of the frame rail and the tooling pin such that the second projection extends into one of the holes in the second half of the frame rail and the pin section extends through at least one of the holes in the second half of the frame rail.

29. The method according to claim 28, further including the step of securing the first half of the frame rail to the second half of the frame rail.

30. A vehicle frame rail, including:
a front rail section, the front rail section having a first end, a second end, a first section and a second section, the first section having a central section, a first flange extending from the central section, a second flange extending from the central section, and a hole pattern, the second section having a central section, a first flange extending from the central section, a second flange extending from the central section, and a hole pattern corresponding at least in part to the hole pattern in the first section, the first flange of the first section extending toward and connected to the first flange of the second section and the second flange of the first section extending toward and connected to the second flange of the second section such that the hole pattern of the first section and the hole pattern of the second section are at least partially aligned and so as to form an enclosed space between the first and second sections;
a center rail section, the center rail section having a first end connected to the second end of the front rail section, a second end, a first section and a second section, the first section having a central section, a first flange extending from the central section, a second flange extending from the central section, and a hole pattern, the second section having a central section, a first flange extending from the central section, a second flange extending from the central section, and a hole pattern corresponding at least in part to the hole pattern in the first section, the first flange of the first section extending toward and connected to the first flange of the second section and the second flange of the first section extending toward and connected to the second flange of the second section such that the hole pattern of the first section and the hole pattern of the second section are at least partially aligned and so as to form an enclosed space between the first and second sections;
a rear rail section, the rear rail section having a first end connected to the second end of the center rail section, a second end, a first section and a second section, the first section having a central section, a first flange extending from the central section, a second flange extending from the central section, and a hole pattern, the second section having a central section, a first flange extending from the central section, a second flange extending from the central section, and a hole pattern corresponding at least in part to the hole pattern in the first section, the first flange of the first section extending toward and connected to the first flange of the second section and the second flange of the first section extending toward and connected to the second flange of the second section such that the hole pattern of the first section and the hole pattern of the second section are at least partially aligned and so as to form an enclosed space between the first and second sections;
a plurality of spacers, each spacer having a first end, a second end, a first projection extending from the first end, a second projection extending from the second end, and a bore extending from the first end to the second end, a first one of the plurality of spacers located such that the first projection extends into one of the holes in the first section of the front rail section and the second projection extends into one of the holes in the second section of the front rail section, a second one of the plurality of spacers located such that the first projection extends into one of the holes in the first section of the center rail section and the second projection extends into one of the holes in the second section of the center rail section, and a third one of the plurality of spacers located such that the first projection extends into one of the holes in the first section of the rear rail section and the second projection extends into one of the holes in the second section of the rear rail section; and
a reinforcing member having a hole pattern corresponding at least in part to the hole pattern in the first and second sections of the center rail section.

31. The vehicle frame rail according to claim 30, wherein at least one of the plurality of spacers extends into one of the holes of the reinforcing member.

32. The vehicle frame rail according to claim 31, wherein the first projection of the at least one of the plurality of spacers extends into one of the holes of the first section of the center rail section.

33. The vehicle frame rail according to claim 31, wherein the first projection of the at least one of the plurality of spacers extends into one of the holes of the first section of the front rail section.

34. A vehicle frame rail, including:
a first half having a hole;
a second half connected to the first half so as to form an enclosed space between the first half and the second half;
a spacer having a first end, a second end, a first projection extending from the first end, and a bore extending from the first end to the second end, the spacer located in the enclosed space such that the first projection extends into the hole in the first half; and
a first reinforcing member located in the enclosed space, the first reinforcing member having a hole aligned with the hole in the first half.

35. The vehicle frame rail according to claim 34, wherein the spacer extends into the hole of the first reinforcing member.

36. The vehicle frame rail according to claim 35, wherein the first projection extends into the hole of the first half.

37. The vehicle frame rail according to claim 1, wherein a portion of the bore adjacent the first end of the spacer tapers inwardly from the first end of the spacer toward the second end of the spacer.

38. The vehicle frame rail according to claim 12, wherein a portion of the bore adjacent the first end of the spacer tapers inwardly from the first end of the spacer toward the second end of the spacer.

* * * * *